United States Patent
Stempin

(10) Patent No.: US 9,676,287 B2
(45) Date of Patent: Jun. 13, 2017

(54) ELECTRIC BATTERY CHARGING INSTALLATION AND METHOD

(75) Inventor: Eric Stempin, Pessac (FR)

(73) Assignee: EVTRONIC, Pessac (FR)

( * ) Notice: Subject to any disclaimer, the term of this patent is extended or adjusted under 35 U.S.C. 154(b) by 250 days.

(21) Appl. No.: 14/235,760

(22) PCT Filed: Jul. 20, 2012

(86) PCT No.: PCT/EP2012/064314
§ 371 (c)(1),
(2), (4) Date: Feb. 10, 2014

(87) PCT Pub. No.: WO2013/017443
PCT Pub. Date: Feb. 7, 2013

(65) Prior Publication Data
US 2014/0167697 A1    Jun. 19, 2014

(30) Foreign Application Priority Data
Jul. 29, 2011    (FR) ...................... 11 02414

(51) Int. Cl.
*H02J 7/00*    (2006.01)
*B60L 11/18*    (2006.01)

(52) U.S. Cl.
CPC ....... *B60L 11/1824* (2013.01); *B60L 11/1812* (2013.01); *B60L 11/1816* (2013.01);
(Continued)

(58) Field of Classification Search
CPC .............. B60L 11/1824; B60L 11/1838; B60L 11/1844; B60L 2230/30; B60L 11/185; B60L 11/1816; B60L 11/1812; Y02T 90/163; Y02T 10/7088; Y02T 90/121; Y02T 90/128; Y02T 90/127; Y02T 90/14; Y02T 10/7005; Y04S 10/126; Y02E 60/721
See application file for complete search history.

(56) References Cited

U.S. PATENT DOCUMENTS

| 5,057,762 A | 10/1991 | Goedken et al. |
| 2007/0153560 A1* | 7/2007 | Zhang ................. B60L 11/1811 363/166 |

(Continued)

FOREIGN PATENT DOCUMENTS

| WO | 2005/008808 A2 | 1/2005 |
| WO | 2011/019855 A1 | 2/2011 |

*Primary Examiner* — Nha Nguyen
(74) *Attorney, Agent, or Firm* — IM IP Law; C. Andrew Im

(57) ABSTRACT

An installation and a method for charging an electric battery for an electric vehicle. The electric vehicle comprises an on-board computer. The installation comprises a main power source delivering a charging power Pc1. The charging method comprises the step of determining the charging power Pc to be delivered to the electric battery in relation to a charging voltage and/or current set point demanded at an instant t by the onboard computer. The charging power is compared against the charging power Pc1 delivered by a main power source. If Pc>Pc1, at least one auxiliary power source delivering a charging power Pc2 is utilized in addition to the main power source such that the sum of the charging powers delivered by the power sources is equal to the charging power Pc.

21 Claims, 2 Drawing Sheets

(52) U.S. Cl.
CPC ....... *B60L 11/1838* (2013.01); *B60L 11/1844* (2013.01); *B60L 2230/30* (2013.01); *Y02E 60/721* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | | |
|---|---|---|---|---|
| 2007/0273214 | A1* | 11/2007 | Wang | H02J 4/00 307/72 |
| 2008/0067974 | A1* | 3/2008 | Zhang | B60L 11/1844 320/104 |
| 2008/0238363 | A1* | 10/2008 | Bourilkov | H02J 7/0073 320/107 |
| 2009/0091291 | A1* | 4/2009 | Woody | B60K 6/48 320/109 |
| 2010/0039062 | A1 | 2/2010 | Gu et al. | |
| 2010/0301810 | A1* | 12/2010 | Biondo | H04Q 9/00 320/155 |

* cited by examiner

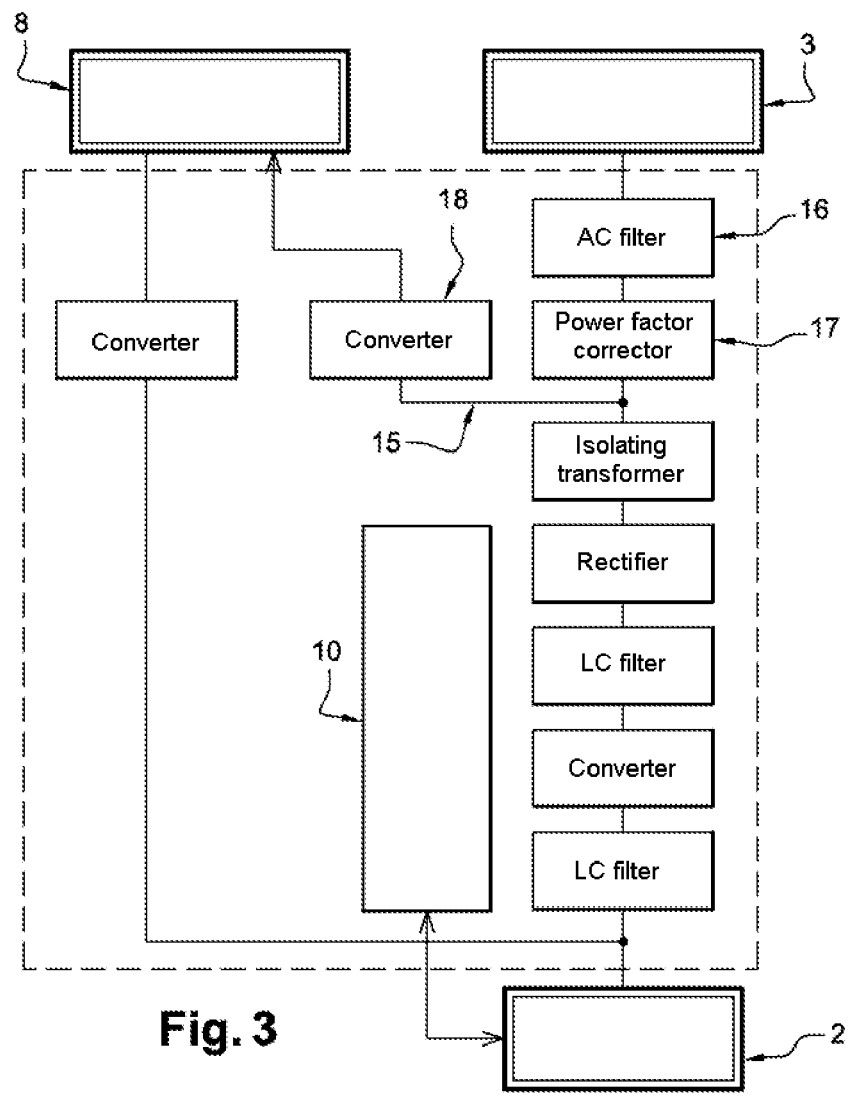
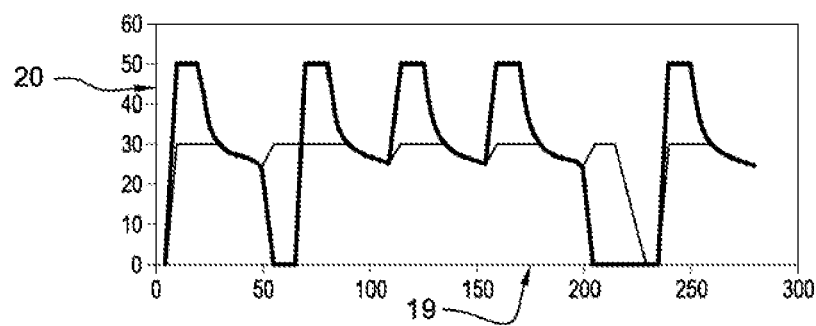

ELECTRIC BATTERY CHARGING INSTALLATION AND METHOD

RELATED APPLICATIONS

This application is a §371 application from PCT/EP2012/064314 filed Jul. 20, 2012, which claims priority from French Patent Application No. 1102414 filed Jul. 29, 2011, each of which is herein incorporated by reference in its entirety.

TECHNICAL FIELD OF THE INVENTION

The present invention relates to a charging installation and method for an electric battery, and more particularly to a fast charging terminal for vehicles equipped with at least one electric battery and one embedded onboard computer.

BACKGROUND OF THE INVENTION

Since the electric car is essentially urban, the recharging of its electric battery or batteries involves the use of existing power outlets and/or a new infrastructure (recharging terminals), to be installed on public roads or in readily accessible places (parking facilities, workplaces, etc.).

Two recharging modes are currently envisaged:
by direct connection (normal or fast recharging),
contactless.

The simplest recharging works using a direct connection, to a so-called normal outlet, delivering an alternating current of 16 A at 220 to 240 V, or approximately 3.7 kVA. The alternating current is transformed in direct current by the car's embedded charger. A complete recharge is done in 6 to 10 h.

The advantage of this type of charge, which can be performed from a conventional domestic outlet, lies in the absence of the need for any new infrastructure, at least for individuals who have a garage or a parking space. This type of charge also has the advantage of offering the possibility of recharging the vehicle at night for several hours, at the time when energy consumption is lowest.

Recharging by fast direct connection requires a dedicated charging terminal, delivering a direct current of a hundred or so amperes, at a voltage currently between 20 and 500 V, directly applied to the batteries of the electric vehicle. The installed power is of the order of 50 kVA.

This type of recharge provides, in principle, an autonomy of 3 to 5 km per minute of charge, provided that the batteries are capable of absorbing high currents without damage. A co-management of the charge by intelligent elements present, on the one hand on the electric vehicle and on the other hand on the fast charging terminal, is necessary.

The fast recharging terminal comprises a charger-rectifier supplied by a three-phase network.

With regard to contactless recharging, two different charging methods are the subject of intensive research:
energy transfer by microwaves,
induction coupling.

In the latter method, the energy passes through a primary winding, generally on the ground, to a secondary winding installed on the vehicle.

With these devices, the user has no more connections to make.

The increase in the number of electric cars will necessarily pose a problem of management of the electrical energy available for charging in the short term.

The quantity of energy consumed by the electric car depends mainly on its efficiency and on the distance that it travels. Designed for an average of 40 km per day, the electric car demands between 4 and 25 kWh per 24 h, which gives an annual consumption of between 1 500 and 9 000 kWh. According to the different sources given by GIFAM (Groupement interprofessionnel des fabricants d'appareils d'équipement ménager, French cross-disciplinary grouping of household equipment appliance manufacturers) and INSEE, in France, the average domestic consumption of the potential users of electric cars would amount to 8 000 kWh and this consumption would amount to 10 000 kWh in the United States.

Thus, the electric car could increase family consumption by 20 to 50%.

If most of the users recharge their cars during the day, the installed power of the electric power stations will increase beyond what is reasonable.

Moreover, the fast recharging, generally requiring 50 kVA, for tens of minutes, will lead not only to an overdimensioning of the electric power stations, but also to a modification of the power lines.

On the other hand, overnight recharging would require a power of approximately 3 kW (recharging for 6 to 10 h), which is easily supported by the existing installations.

Now, it is observed that the fast charging terminals for electric vehicles are all currently powered by a single power source: generally the electrical distribution network.

The energy consumed and the power demanded by the simultaneous recharging of a large number of electric batteries could lead not only to an overdimensioning of the electric power stations, but also to a modification of the power lines.

This additional electricity demand will consequently have negative impacts on:
the $CO_2$ content of the electrical kWh (depending on the electricity production mode: nuclear, hydraulic, thermal, etc.);
the management, the architecture and the control of the electricity distribution networks;
the management of peak electrical consumption and in particular the impact of fast recharging;
local reinforcement of the electricity network.

OBJECT AND SUMMARY OF THE INVENTION

The present invention aims to mitigate these various drawbacks by proposing a charging installation and method, that are simple in their design and in their procedures, that make it possible to ensure the recharging of an electric battery that is both fast and economical.

Another subject of the present invention is such an installation and such a charging method that make it possible to reduce the impact of the electricity demand on the network by reducing the demands for power on the electricity distribution network. They will have the effect:
of reducing the $CO_2$ content of the electrical kWh needed for recharging electric vehicles;
smoothing the electrical energy consumption and therefore facilitating the production forecasting thereof;
offering the possibility of connecting a fast charging terminal to more points of connection to the electricity distribution network than would have been possible because the network connection power is reduced.

The aim of the objective of the invention is to reduce the power of the point of connection to the electricity distribution network without in any way reducing the efficiency of the fast charging terminal.

To this end, the subject of the present invention is a charging installation for an electric battery for a vehicle, said installation comprising a main power supply source capable of delivering a charging power $Pc_1$ and a first circuit for converting the supply current or voltage delivered by said main source into a charging current or voltage for said electric battery.

According to the invention, this installation comprises
- at least one auxiliary power supply source capable of delivering a charging power $Pc_2$,
- at least one second circuit for converting the supply current or voltage delivered by said auxiliary source into a charging current or voltage for said electric battery, said at least one second circuit being connected in parallel to said first circuit,
- a management system controlling said at least one auxiliary source so as to activate at least one of said auxiliary sources when the charging power Pc required to charge said battery is greater than the charging power $Pc_1$ likely to be delivered by said main source.

The term "vehicle" should be understood to mean a motorized vehicle of terrestrial, nautical or airborne type, that is to say, and in a purely illustrative manner, a boat, an aircraft, an automobile, a truck, a bus or even a quad bike.

The aim of the invention is to reduce the impact of the electricity demand on the network by reducing the calls for power on the electricity distribution network. It will have the effect of:
- smoothing the electrical energy consumption;
- facilitating the forecasting of electrical energy production because the electrical energy consumption is smoothed in time;
- reducing the $CO_2$ content of the electrical kWh needed to recharge electric vehicles because the electrical energy consumption is smoothed over time;
- not requiring the local reinforcement of the electricity network because the power consumed on the electrical network is lower;
- reducing the overall cost of the use of a fast charging station because the cost of connection to the network and of subscription is reduced;
- offering the possibility of connecting a fast charging terminal to more charging points than would have been possible because the network connection power is reduced (ease of installation);
- maintaining the charging efficiency of the electric vehicle.

In different particular embodiments of this charging installation, each having its particular advantages and susceptible to numerous possible technical combinations:
- the main power supply source is the electricity supply network delivering a mains voltage or a mains current,
- said at least one auxiliary source comprises a power supply unit chosen from the group comprising a battery, a super-capacitor, an inertia wheel, a fuel cell, a generator set, photovoltaic solar panels and combinations of such elements,
- said vehicle comprising an onboard computer controlling said battery to be charged, said installation comprises a communication system to allow for the real-time transfer of information between said installation and said onboard computer, said information comprising at least one charging setpoint value supplied by said onboard computer.

This charging setpoint value is a charging current and/or charging voltage value.

Preferentially, the management system then comprises a computation unit for determining the charging power Pc corresponding to the charging current and/or charging voltage values required by said onboard computer.

Advantageously, the charging power $Pc_1$ likely to be delivered by said main power supply source being variable as a function of time, said installation comprises a unit for measuring in real time said charging power $Pc_1$, said measurement unit sending information to said computation unit.

This may be notably the case when, in the course of the day, several users consume energy by being connected to one and the same connection point.
- the installation comprises programmable means for limiting the charging power delivered by said main source such that $Pc_1 < Pc_{max}$, in which $Pc_{max}$ is the maximum charging power likely to be delivered by said main supply source,
- said first circuit for converting the supply current or voltage delivered by said main source into a charging current or voltage for said electric battery comprises a circuit for controlling a switch for supplying current to a primary winding of a transformer, said control circuit operating in isolated switching mode at a high frequency or at a low frequency,
- said installation comprises a charging circuit for said at least one auxiliary source, connected to said main power supply source to recharge said at least one auxiliary source.

Preferentially, this installation comprising a plurality of auxiliary sources connected to said charging circuit by switches, said management system controls the level of charge of each of said auxiliary sources and controls said switches to independently recharge each of said auxiliary sources.

The present invention also relates to a method for charging an electric battery for a vehicle, in which there are implemented a main power supply source likely to deliver a charging power $Pc_1$ and at least one auxiliary power supply source capable of delivering a charging power $Pc_2$ such that the sum of the charging powers delivered by said sources to the electric battery is equal to a charging power Pc.

According to the invention,
- for each of said auxiliary power supply sources, a circuit is implemented for converting the supply current or voltage delivered by said corresponding auxiliary source into a charging current or voltage for said electric battery, said circuit being placed between said corresponding auxiliary source and the connection node of the different power supply sources.

The voltage delivered by each auxiliary source thus advantageously becomes irrelevant, which makes it possible to connect any auxiliary power supply source to the charging installation without having to know its voltage.

Such a circuit for converting the supply current or voltage delivered by said at least one auxiliary power supply source consequently allows for a greater flexibility in the choice and the dimensioning of this auxiliary source, and makes it possible, for example, to overcome the drawbacks associated with the implementation of a battery (voltage which changes as a function of the state of charge, etc.).

Furthermore, this parallel connection of the circuits for converting the supply current or voltage advantageously makes it possible to be able to upgrade an existing system by adding modules without compromising the initial equipment deployed in the charging installation.

In different particular embodiments of this charging method, each having its particular advantages and susceptible to numerous possible technical combinations:

the charging power delivered by said main power supply source is measured in real time and a maximum power value $Pc_{max}$ to be output from said main source is defined.

It is thus possible to continuously control the charging power obtained from said main source such that the latter does not exceed a determined setpoint value, the additional charging power for charging the electric battery being obtained by said at least one auxiliary power supply source.

the charging power $Pc_1$ likely to be delivered by said main power supply source being variable as a function of time, said charging power $Pc_1$ is measured.

The charging power $Pc_2$ that said at least one auxiliary power supply source has to provide to ensure the charging of said electric battery is advantageously determined from the $Pc_{max}$ or $Pc_1$ value.

said required charging power Pc being strictly less than $Pc_1$, said at least one auxiliary power supply source is charged simultaneously with said electric battery with a charging power $Pc_4$ such that $Pc_4 \leq Pc_1 - Pc$.

This embodiment thus makes it possible to recharge the auxiliary power supply source simultaneously with the charging of the electric battery. It is thus possible to be able to directly charge another electric battery after having completed the charging of the first electric battery.

said vehicle comprising an onboard computer and the charging power Pc delivered to said battery to be charged being less than a desired charging power value, said charging value Pc is communicated to said onboard computer, charging a single electric battery at a time, a plurality of electric batteries are charged sequentially.

Preferentially, each of said batteries is charged for a charging time T less than the charging time needed to charge an electric battery in one go.

The present invention also relates to a method for charging an electric battery for a vehicle, said vehicle comprising an onboard computer, in which:

the charging power Pc to be delivered to the electric battery of said vehicle is determined, during a DC voltage charge of said battery, relative to a charging set point demanded at an instant t by said onboard computer, this charging power is compared to the charging power $Pc_1$ likely to be delivered by a main power supply source, if $Pc > Pc_1$, at least one auxiliary power supply source capable of delivering a charging power $Pc_2$ is implemented in addition to said main source, such that the sum of the charging powers delivered by said sources is equal to the required charging power Pc.

This charging set point is a charging current and/or charging voltage value.

Preferentially, said main power supply source is the electricity supply network delivering a mains voltage.

Advantageously, the value of the charging power $Pc_1$ is determined relative to a maximum charging power $Pc_{max}$ likely to be delivered by the main power supply source.

Preferentially, the charging power $Pc_1$ likely to be delivered by said main power supply source being variable as a function of time, said charging power $Pc_1$ is advantageously measured in real time.

Advantageously, the required charging power Pc being strictly less than $Pc_1$, said at least one auxiliary power supply source is charged simultaneously with said electric battery with a charging power $Pc_4$ such that $Pc_4 \leq Pc_1 - Pc$.

BRIEF DESCRIPTION OF THE DRAWINGS

The invention will be described in more detail with reference to the appended drawings in which:

FIG. 3 schematically shows the circuits for converting the supply voltages or currents delivered by the main and auxiliary sources of an electrical charging installation into a charging current or voltage for a battery according to another embodiment;

FIG. 4 is a comparison of the power consumed on the main source between a charging terminal of the prior art (black solid lines) and an installation (grey solid line) according to an implementation of the present invention, this main source being the electricity supply network, the x axis representing time and the y axis representing the consumed power in kVA.

DETAILED DESCRIPTION OF THE EMBODIMENTS

Figure 1:
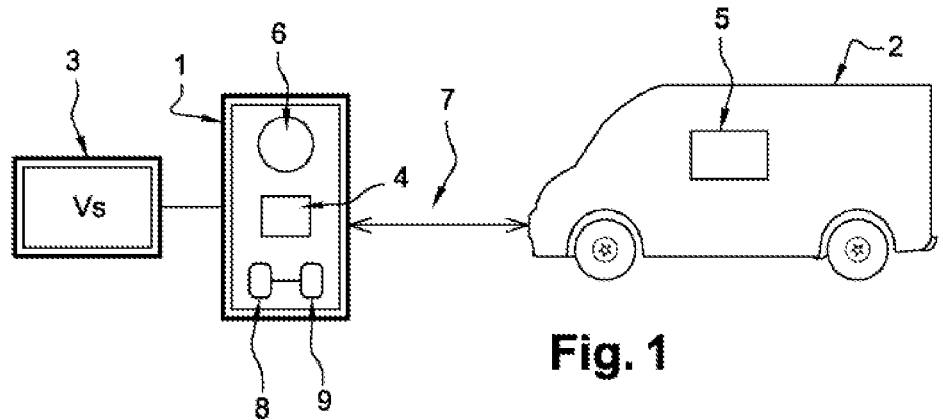
FIG. 1 is a schematic representation of an electrical charging installation for a battery according to a particular embodiment of the invention.
Figure 2:
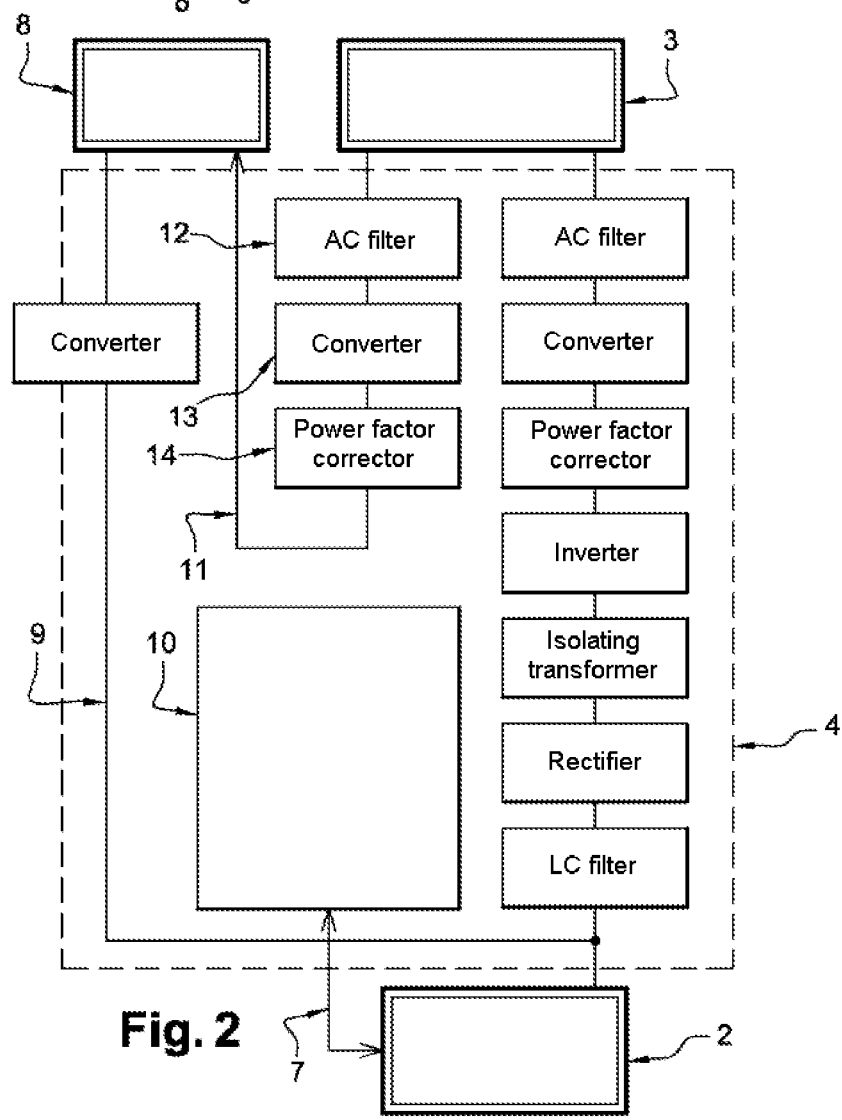
FIG. 2 schematically shows the circuits for converting the supply voltage delivered by the primary source and the voltage or the current delivered by the secondary source of the installation of FIG. 1, into a charging current or voltage for an electric battery.

FIGS. 1 and 2 show an electric charger 1 for the battery, notably of an electric vehicle 2, according to a preferred embodiment of the invention. This charger 1 is adapted to rapidly charge such a battery, for example in approximately 30 minutes.

The present battery charger 1 comprises a rack linked to the electricity supply network 3 delivering a mains voltage $V_S$. This electricity supply network 3 constitutes a primary power source for this terminal 2 in order to recharge the battery of the electric vehicle 2. The charging power $Pc_1$ delivered by the electricity network 3 is here equal to 36 kW, that is to say that it is a standard connection point.

The rack comprises a first electrical conversion circuit 4 making it possible to convert the mains voltage delivered by the electricity supply network 3 into a charging current or voltage for the electric battery to be charged.

This first electrical conversion circuit 4 comprises a circuit for controlling a switch for supplying current to a primary winding of a transformer, said control circuit operating in isolated switching mode at a high frequency, typically 80 000 Hz.

The electric vehicle 2 comprising an onboard computer 5 controlling the battery to be charged, the charging terminal 1 comprises a communication system 6 to allow for the real-time transfer of information between this charging terminal 1 and the onboard computer 5 of the car 2.

In particular, this communication system, which here comprises either a wired communication 7 such as a Controller Area Network (CAN) bus, a power line communication (CPL) or a pilot wire communication (ISO 61851 SAE J1772) or even a K/L line (ISO 9141), or a radio link such as Zigbee, Wifi, or Bluetooth, enables the charging terminal 1 to receive from the onboard computer 5 the charging set point (charging current and/or voltage) required to charge the battery, this charging setpoint being variable over time.

Notably, two charging phases are distinguished:
- a so-called "BOOST" charging phase: restoring a maximum of the battery capacity, generally from 0% to 50% of the state of charge of the battery, in a minimum of time, generally 10 minutes,
- an equalization phase, also called "ABSORPTION" phase, during which a further progressive charge is performed up to 100% of the battery capacity. This phase is generally of the order of 30 minutes.

The rack also comprises a secondary internal power supply source 8 capable of delivering a charging power $Pc_2$. This secondary source is here an electrochemical battery.

The dimensioning of this secondary source 8 is done to ensure the first battery charging phase, called "BOOST" phase, when the charging power Pc required by the onboard computer 5 of the electric car to charge its battery is greater than the charging power $Pc_1$ likely to be supplied by the electricity network 3.

As an illustration, the useful energy supplied by the secondary source is 5 to 10 kW·h, the charging power $Pc_2$ being 20 kW. This dimension can obviously be increased according to the requirements, by way of example, to ensure one or more successive charges without having to recharge the secondary source.

The rack comprises a second circuit 9 for converting the supply current or voltage delivered by said auxiliary source 8 into a charging current or voltage for said electric battery, said at least one second circuit being connected in parallel to said first circuit 4. The first and second conversion circuits 4, 9 are connected in parallel so as to supply the charging setpoint (charging current and/or voltage) required by the onboard computer 5 of the electric car to charge the battery.

The charging terminal 1 comprises a management system 10 controlling the secondary supply source so as to activate the latter when the charging power Pc required to charge said battery is greater than the charging power $Pc_1$ likely to be delivered by the primary power source 3.

Thus, and when the power consumed on the electricity network is almost constant throughout the charging of the vehicle (from 0% to 100% of state of charge—SOC), the additional energy needed during the first charging phase, called "Boost" phase, is supplied by the secondary power source. During the second charging phase, called "Absorption" phase, the energy delivered to the vehicle decreases over time. The energy delivered to the vehicle 2 originates from the main power source 3 and from the secondary power source 8 as long as $Pc>Pc_1$. As soon as $Pc<Pc_1$, the energy delivered to the vehicle 2 originates exclusively from the primary power source while the secondary power source 8 is recharged by the primary power source 3.

If, however, on completion of the second vehicle charging phase, the secondary power source 8 is not totally recharged, it has the possibility of being recharged by the primary power source 3.

When the secondary source 8 is drained and a charge is demanded, the charging terminal 1 can ensure a charge by supplying a power which does not exceed the power supplied by the electricity supply network 3 alone, for example 36 kW.

The charging terminal 1 consequently comprises a charging circuit 11 dedicated to the secondary source 8, this charging circuit 11 being directly connected to the electricity supply network 3. This charging circuit 11 here comprises a filter 12, a converter 13 and a power factor correction device 14.

The battery charger 1 also comprises cooling means to lower the temperature of its electrical circuits and electronic components, thus preventing the charger from becoming too hot during a fast battery charge. These cooling means here comprise one or more fans (not represented) as well as heat-exchange structures such as cooling fins (not represented).

FIG. 3 schematically shows the circuits for converting the supply currents or voltages delivered by main 3 and auxiliary 8 sources of an electrical charging installation into a charging current or voltage for a battery according to another embodiment.

The first circuit 4 for converting the supply current or voltage delivered by the main source into a charging current or voltage for the electric battery comprises a circuit controlling a switch for supplying current to a primary winding of a transformer, this control circuit operating in isolated switching mode at a low frequency, typically 20 000 Hz.

The charging circuit 15 of the auxiliary source reuses the input stage of the first circuit 4, this input stage comprising a filter 16 and a power factor correction device 17. The charging circuit 15 comprises, after this stage, a converter 18.

The invention claimed is:

1. A charging installation for an electric battery of an electric vehicle, comprising:
- a main power supply source configured to deliver a charging power $Pc_1$;
- a first circuit to convert a supply current or voltage delivered by the main power supply source into a charging current or voltage for the electric battery, the first circuit comprising a control circuit to control a switch supplying a current to a primary winding of a transformer, the control circuit operating in an isolated switching mode at a high frequency or at a low frequency;
- at least one auxiliary power supply source configured to deliver a charging power $Pc_2$;
- at least one second circuit to convert a supply current or voltage delivered by the auxiliary power supply source into a charging current or voltage for the electric battery, said at least one second circuit being connected in parallel to the first circuit;
- a management system controlling and activating said at least one auxiliary power supply source when a charging power Pc required to charge the battery is greater than the charging power $Pc_1$ delivered by the main power supply source;
- wherein the electric vehicle comprises an onboard computer controlling the electric battery to be charged; and
- a communication system for a real-time transfer of information between the charging installation and the onboard computer, said information comprising at least one charging set point value supplied by the onboard computer.

2. The charging installation of claim 1, wherein the main power supply source is a electricity supply network delivering a mains voltage or a mains current.

3. The charging installation of claim 1, wherein said at least one auxiliary power supply source comprises at least one of the following power supply unit: a battery, a supercapacitor, an inertia wheel, a fuel cell, a generator set or photovoltaic solar panels.

4. The charging installation of claim 1, wherein the management system comprises a computation unit to determine the charging power Pc corresponding to at least one of a charging current value or a charging voltage value required by the onboard computer.

5. The charging installation of claim 4, wherein the charging power $Pc_1$ delivered by the main power supply source is a variable that varies as a function of time; and further comprising a measuring unit to measure in real time the charging power $Pc_1$ and sending information to the computation unit.

6. The charging installation of claim 1, wherein the management system limits the charging power $Pc_1$ delivered by the main power supply source such that $Pc_1 < Pc_{max}$, in which $Pc_{max}$ is a maximum charging power deliverable by the main power supply source.

7. The charging installation of claim 1, further comprising a charging circuit for said at least one auxiliary power supply source, connected to the main power supply source to recharge said at least one auxiliary power supply source.

8. The charging installation of claim 7, wherein the charging circuit comprises a filter, a converter and a power factor correction device.

9. A method for charging an electric battery for an electric vehicle, comprising the steps of:
provinding a charging power $Pc_1$ from a main power supply source;
converting a supply current or voltage delivered by the main power supply source into a charging current or voltage for the electric battery by a first circuit, the first circuit comprising a control circuit;
controlling a switch supplying a current to a primary winding of a transformer by the control circuit of the first circuit, the control circuit operating in an isolated switching mode at a high frequency or at a low frequency;
providing a charging power $Pc_2$ from at least one auxiliary power supply source such that a sum of the charging powers delivered by the power supply sources to the electric battery is equal to a charging power Pc;
for each auxiliary power supply source, converting a supply current or voltage delivered by said each auxiliary power supply source into a charging current or voltage for the electric battery by a second circuit positioned between said each auxiliary power supply source and a connection node of different power supply sources;
controlling the electric battery to be charged by an onboard computer of the electric vehicle; and
transferring information in real-time between the charging installation and the onboard computer by a communication system, said information comprising at least one charging set point value supplied by the onboard computer.

10. The method of claim 9, further comprising the steps of measuring the charging power delivered by said main power supply source in real time and defining a maximum power value $Pc_{max}$ output from the main power supply source.

11. The method of claim 10, further comprising the step of determining the charging power $Pc_2$ to be provided by said at least one auxiliary power supply source to ensure the charging of the electric battery from the $Pc_{max}$ or $Pc_1$ value.

12. The method of claim 9, wherein the charging power $Pc_1$ delivered by the main power supply source is a variable that varies as a function of time; and further comprising the step of measuring the charging power $Pc_1$.

13. The method of claim 9, wherein the charging power Pc is less than $Pc_1$; and further comprising the step of simultaneously charging the electric battery and said at least one auxiliary power supply with a charging power $Pc_4$, such that $Pc_4 \leq Pc_1 - Pc$.

14. The method of claim 9, wherein the electric vehicle comprises an onboard computer; wherein the charging power Pc delivered to the electric battery is less than a desired charging power value; and further comprising the step of communicating the charging value Pc to the onboard computer.

15. The method of claim 9, further comprising the step of charging a plurality of electric batteries sequentially, a single electric battery at a time.

16. The method of claim 15, further comprising the step of charging each electric battery for a charging time T less than the charging time needed to fully charge said each electric battery.

17. A method for charging an electric battery for an electric vehicle comprising an onboard computer, comprising the steps of:
providing a charging power $Pc_1$ from a main power supply source;
converting a supply current or voltage delivered by the main power supply source into a charging current or voltage for the electric battery by a first circuit, the first circuit comprising a control circuit;
controlling a switch supplying a current to a primary winding of a transformer by the control circuit of the first circuit, the control circuit operating in an isolated switching mode at a high frequency or at a low frequency;
determining a charging power Pc delivered to the electric battery of the electric vehicle, during a DC voltage charge of the electric battery, relative to a charging set point demanded at an instant t by the onboard computer;
comparing the charging power Pc to the charging power $Pc_1$ delivered by the main power supply source;
delivering a charging power $Pc_2$ from at least one auxiliary power supply source to supplement the main power supply source based on a determination that $Pc > Pc_1$, such that the sum of the charging powers delivered by the power supply sources is equal to the charging power Pc.

18. The method of claim 17, wherein the main power supply source is an electricity supply network delivering a mains voltage.

19. The method of claim 17, further comprising the step of determining a value of the charging power $Pc_1$ relative to a maximum charging power $Pc_{max}$ delivered by the main power supply source.

20. The method of claim 17, wherein the charging power $Pc_1$ delivered by the main power supply source is variable that varies as a function of time; and further comprising the step of measuring the charging power $Pc_1$.

21. The method of claim 17, wherein the charging power Pc is less than $Pc_1$; and further comprising the step of simultaneously charging the electric battery and said at least one auxiliary power supply with a charging power $Pc_4$, such that $Pc_4 \leq Pc_1 - Pc$.

* * * * *